Feb. 5, 1929.

1,701,329

H. E. McINTOSH

DEVICE FOR RESURFACING VALVE SEATS

Filed June 7, 1924

Inventor:
Harry E. McIntosh

By Gillson, Mann & Cox
Attys.

Patented Feb. 5, 1929.

1,701,329

UNITED STATES PATENT OFFICE.

HARRY E. McINTOSH, OF BIG RAPIDS, MICHIGAN.

DEVICE FOR RESURFACING VALVE SEATS.

Application filed June 7, 1924. Serial No. 718,494.

This invention relates to valve reseating devices or tools for resurfacing the seats of valves in bibbs or faucets and the like.

One of the objects of the invention is the provision of a new and improved tool for resurfacing valve seats that is provided with a centering device that will accurately hold the tool in proper position during the facing or resurfacing operation and which is so constructed that the valve facing element may be maintained in contact with the valve seat surface by pressure alone.

Another object of the invention is the provision of a new and improved valve seat resurfacing tool that is provided with resilient means which by the application of pressure to the tool will hold the centering device in proper position and at the same time will permit the valve seat facing element to remain in constant contact with the surface of the valve seat that is being operated upon.

Still further objects of the invention are the provision of valve seat resurfacing tool that is cheap to manufacture, simple in construction, easily manipulated, efficient in operation, and one that is not likely to become broken or get out of order.

Figure 1:
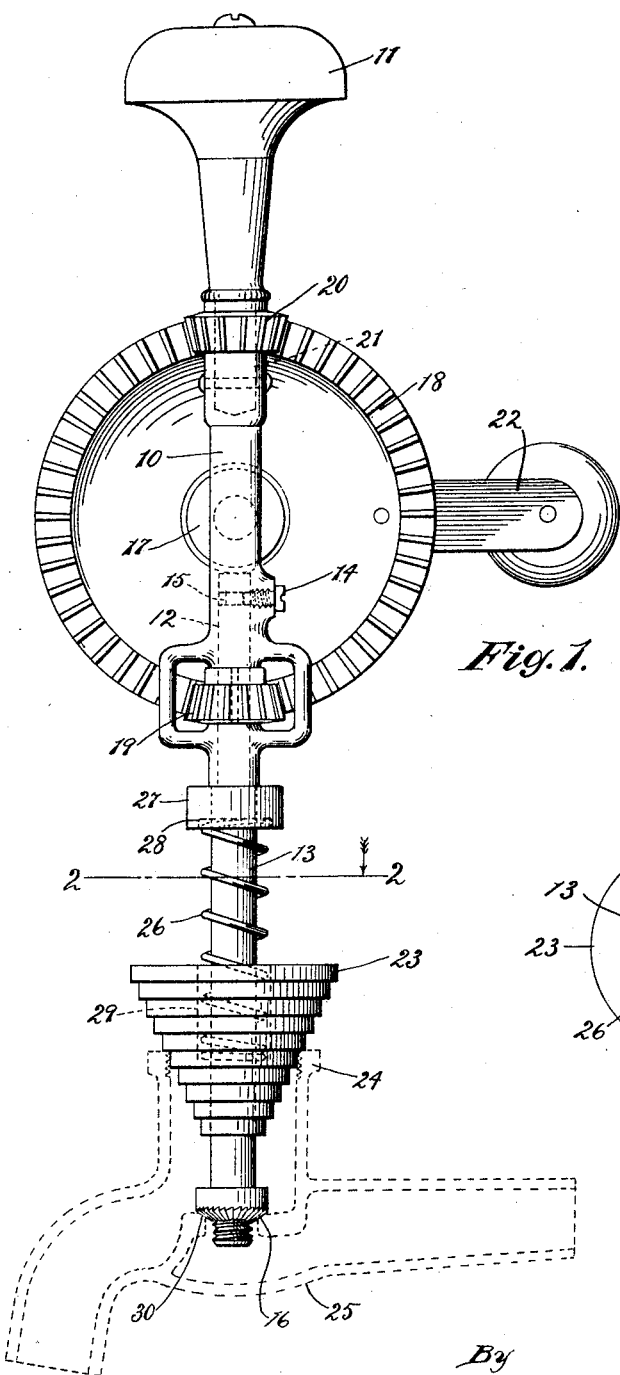
Figure 2:
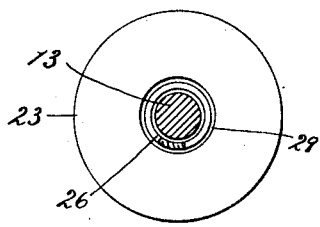

Other and further objects and advantages of the invention will appear from the following description taken in connection with the accompanying drawings, in which Figure 1 is a side elevation of the device showing the same in operative position; and Fig. 2 is a section on line 2—2 of Fig. 1.

On the drawings, the reference character 10 designates the support or supporting frame of the tool to the upper end of which is secured the handle 11. The lower end of the support is provided with a bore 12 in which is journaled the reduced end of the spindle or shaft 13. The spindle or shaft 13 is retained in the bore 12 by a retaining screw 14 the inner end of which engages an annular groove 15 in the spindle or shaft 13 as is usual in such constructions.

A suitable valve seat facing element 16 is adapted to be detachably mounted on the lower end of the spindle or shaft 13 as by being threaded thereon, as clearly shown in Fig. 1 of the drawings.

Suitable means are provided for rotating the spindle or shaft 13. Preferably a system of multiplying gears is employed. As shown, the support 10 is provided with a laterally extending journal 17 on which is rotatably mounted the gear wheel 18 which is adapted to mesh with a pinion 19 keyed to the spindle or shaft 13. In order to equalize the pressure an idler pinion 20 is journaled on the attaching portion 21 of the handle 11 and engages the teeth of the gear 18. The gear wheel 18 is adapted to be manually rotated by means of the crank arm or crank handle 22.

It is desirable that means be provided for centering the tool or for holding the same in proper position for accurately facing or resurfacing the valve seat. It is also desirable that this means be so constructed and the parts so arranged that the centering device may be held in proper position and the valve seat facing element be made to properly engage the valve seat by the application of pressure alone on the handle 11. In the form of the device selected to illustrate one embodiment of the invention a centering member 23 is slidably and rotatably mounted on the spindle or shaft 13. The centering member may be and preferably is in the form of a stepped frusto-conical member whereby it may properly engage the valve stem supporting hub or projection 24 of a faucet or bibb 25 as indicated in dotted lines in Fig. 1.

Suitable means are provided whereby when the centering member is in position in the valve stem supporting hub the cutter or grinder element 16 may be lowered into engagement with the valve seat. Resilient means is employed for this purpose. As shown, a spring 26 loosely mounted on the spindle or shaft 13 is interposed between the centering member and a collar 27, which collar is loosely mounted on the spindle 13 at the lower end of the support. Preferably, though not necessarily, the collar 27 and the centering member 23 are provided on their opposing faces with counterbores 28 and 29, respectively, for receiving the ends of said coil spring 26.

In the operation of the device the valve stem and packing are removed from the faucet and the spindle 13 inserted. The centering device will engage the hub 24. Pressure may now be applied on the handle 11 for causing the centering device to engage the hub 24 for centering and holding the spindle in the proper position and for causing the valve seat facing element to properly engage the valve seat as at 30. By turning the crank arm 22 the facing element 16 is caused to resurface the valve seat.

It is thought from the foregoing taken in connection with the accompanying drawings that the construction and operation of my device will be apparent to those skilled in the art, and that various changes in size, shape, proportion and details of construction may be made without departing from the spirit and scope of the appended claim.

I claim as my invention:—

A device for resurfacing valve seats comprising a portable support, a spindle rotatably mounted in said support, a handle on the upper end of said support, a gear journaled on said support, means for continuously rotating said gear, a pinion on said spindle for engaging said gear for rotating said spindle, a stepped centering member loosely mounted on said spindle and adapted to engage a valve stem supporting hub for positioning said spindle, a valve seat surfacing element on the outer end of said spindle, said element having means on its outer face for surfacing a valve seat, and a spring on said spindle between said centering member and support for normally holding said element out of contact with the valve seat while said member is being positioned in said hub, said element being adapted to be forced into engagement with said valve seat by pressure on said handle against the compression of said spring.

HARRY E. McINTOSH.